Patented Oct. 15, 1929

1,731,623

UNITED STATES PATENT OFFICE

HARRY GRIMMEL, OF WIESDORF, AND HEINRICH CLINGESTEIN, OF COLOGNE-ON-THE-RHINE, GERMANY, ASSIGNORS TO GENERAL ANILINE WORKS, INC., OF NEW YORK, N. Y., A CORPORATION OF DELAWARE

NEW AZO DYESTUFFS

No Drawing. Application filed July 28, 1927, Serial No. 209,171, and in Germany August 19, 1926.

The present invention relates to the new unsulfonated and uncarboxylated azo dyestuffs of the general formula:

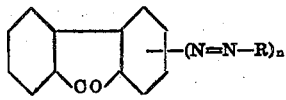

wherein R represents the radicle of an unsulfonated and uncarboxylated coupling component, such as, for instance, an unsulfonated and uncarboxylated naphthol, arylide of the 2.3-hydroxynaphthoic acid, hydroxynaphthocarbazole, diaceto-acetic acid arylide and the like, and wherein $n$ is 1 or 2.

The new dyestuffs may be produced either in substance or on a substratum or on the fiber by coupling a diazotized amino fluorenone with one of the above mentioned components forming insoluble azo dyestuff. The dyestuffs produced are yellow to black powders insoluble in water and fast to light and to washing. According to the selection of the coupling components yellow, red, violet and black dyestuffs can be produced which show outstanding fastness on the fibre.

The following examples serve to illustrate our invention, which can be varied according to individual requirements:—.

*Example 1.*—Well boiled and dried cotton yarn is impregnated with a solution containing per litre 12 grams of 2.3-hydroxy-naphthoic acid anilide, 20 cc. of caustic soda solution of 34° Bé., 25 cc. of Turkey red oil, wrung out and developed without drying with a diazo-solution previously freed from mineral acid by the addition of acetate, containing 5 grams of mono-amino-fluorenone per litre. After the formation of the dyestuff the yarn is rinsed and soaped, the dyestuff thus produced is a reddish powder insoluble in water yielding a very beautiful red shade on cotton, fast to light and to washing. The dyestuff probably has the formula:

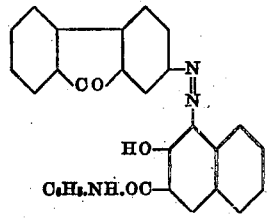

*Example 2.*—By the use of mono-aminofluorenone and 2:3-hydroxy-naphthoic acid-dianisidide a reddish-brown dyestuff is obtained in a similar manner. This dyestuff has the same qualities as described in Example 1. The dyestuff probably has the formula:

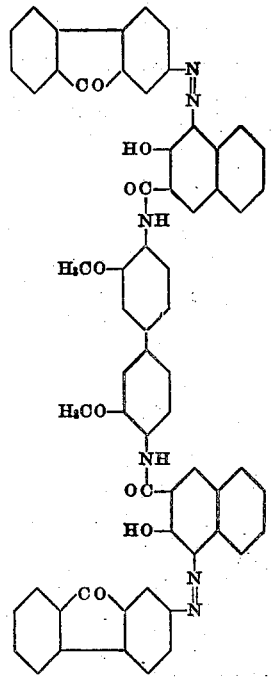

*Example 3.*—By the use of mono-aminofluorenone and β-naphthol a beautiful red dyestuff is obtained with the same qualities as described in the above mentioned examples. The dyestuff probably has the formula:

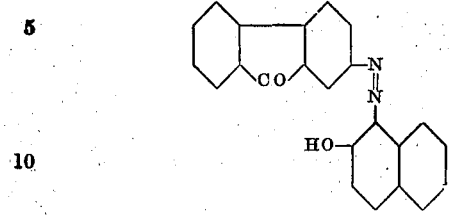

*Example 4.*—By the use of 2:7-diamino fluorenone and 2.3-hydroxy-naphthoic acid-anilide a violet dyestuff is obtained showing the same qualities as mentioned in the preceding examples. The dyestuff probably has the formula:

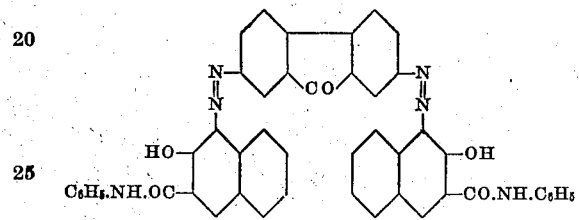

*Example 5.*—By the use of 2.7-diamino-fluorenone and 7-hydroxy-naphtho-carbazole a deep black dyestuff is obtained in a similar manner. Its qualities are the same as in Example 4. The dyestuff probably has the formula:

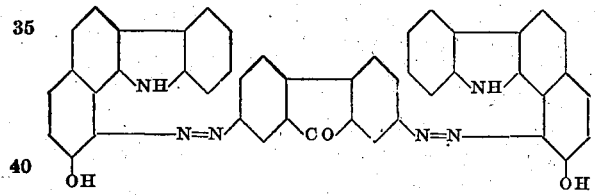

*Example 6.*—Fibres impregnated with diaceto-acetic-acid tolidide and developed with the tetrazo compound of diamino-fluorenone are dyed a powerful bronze-yellow with the same qualities as mentioned above. The dyestuff probably has the formula:

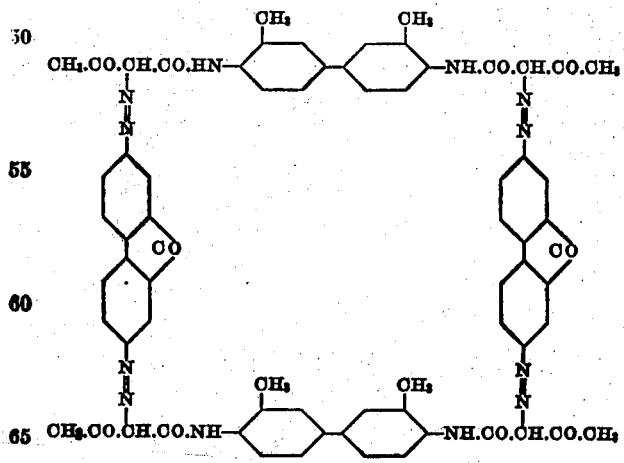

*Example 7.*—19,5 parts by weight of monoamino-fluorenone are dissolved in water with 28 parts by weight of hydrochloric acid (19° Bé.) and while cooling diazotized with a solution from 6,9 parts by weight of sodium nitrite. This solution is introduced into a caustic sodium carbonate solution of 30 parts by weight of the sodium salt from 2.3-hydroxy-naphthoic acid anilide. The dyestuff separated from this solution is filtered off, washed with water and dried. It is a reddish powder insoluble in water yielding a red pigment fast to light and to washing. The dyestuff probably has the formula:

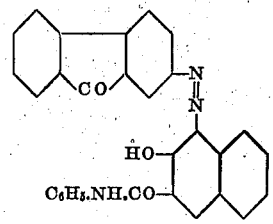

The process can be carried out in a similar manner with other amino-fluorenones and other arylides of 2:3-hydroxy-naphthoic acid or similar hydroxy-naphtho-carbazoles as well as with other diaceto-acetic acid arylides and derivatives thereof.

We claim:—
1. Process for the manufacture of an azo dyestuff insoluble in water, by coupling a diazo compound of an unsulfonated and uncarboxylated amino-fluorenone with an unsulfonated and uncarboxylated coupling component.
2. Process for the manufacture of an azo dyestuff insoluble in water by coupling the diazo compound of the unsulfonated monoamino-fluorenone with 2.3-hydroxy-naphthoic acid anilide.
3. As new products the unsulfonated and uncarboxylated azo dyestuffs of the general formula:

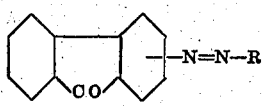

wherein R represents the radicle of a coupling component.

4. As new products the unsulfonated and uncarboxylated azo dyestuffs of the general formula:

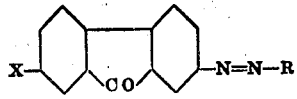

wherein R represents the radicle of a coupling component and X represents either hydrogen or the group:

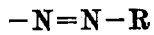

5. As a new product the unsulfonated and uncarboxylated azo dyestuff of the formula:

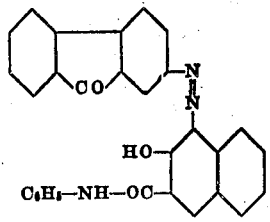

being in a dry state a reddish powder insoluble in water and yielding on cotton a beautiful red shade fast to light and washing.

6. As new products the unsulfonated and uncarboxylated azo dyestuffs of the general formula:

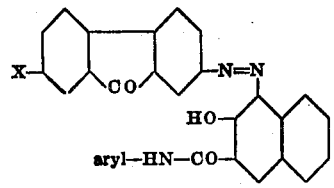

wherein X represents hydrogen or the grouping:

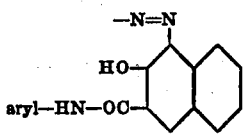

In testimony whereof we have hereunto set our hands.

HARRY GRIMMEL.
HEINRICH CLINGESTEIN.